(12) United States Patent
Shen et al.

(10) Patent No.: US 9,036,157 B2
(45) Date of Patent: May 19, 2015

(54) SYSTEM OF COMPUTING SURFACE RECONSTRUCTION, IN-PLANE AND OUT-OF-PLANE DISPLACEMENTS AND STRAIN DISTRIBUTION

(71) Applicant: National Applied Research Laboratories, Taipei (TW)

(72) Inventors: Ming-Hsing Shen, Hsinchu (TW); Chi-Hung Huang, Hsinchu (TW); Wei-Chung Wang, Hsinchu (TW); Yung-Hsiang Chen, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 191 days.

(21) Appl. No.: 13/655,540

(22) Filed: Oct. 19, 2012

(65) Prior Publication Data

US 2014/0111810 A1 Apr. 24, 2014

(51) Int. Cl.
*G01B 11/02* (2006.01)
*G01B 9/02* (2006.01)
*G01B 11/16* (2006.01)

(52) U.S. Cl.
CPC ............ *G01B 9/0203* (2013.01); *G01B 11/161* (2013.01); *G01B 9/02087* (2013.01)

(58) Field of Classification Search
CPC ............... G01B 11/161; G01B 11/164; G01B 9/02029; G01B 9/0203; G01D 5/35325; G01M 11/005
USPC ..................................................... 356/73, 511
See application file for complete search history.

(56) References Cited

U.S. PATENT DOCUMENTS

| | | | |
|---|---|---|---|
| 2007/0035744 A1* | 2/2007 | Lehmann et al. | 356/512 |
| 2007/0046948 A1* | 3/2007 | Podoleanu et al. | 356/497 |
| 2009/0059208 A1* | 3/2009 | Steffens et al. | 356/73 |
| 2010/0134786 A1* | 6/2010 | De Lega et al. | 356/73 |
| 2012/0320380 A1* | 12/2012 | Schonleber et al. | 356/479 |

\* cited by examiner

*Primary Examiner* — Tarifur Chowdhury
*Assistant Examiner* — Jonathan Cook
(74) *Attorney, Agent, or Firm* — Chih Feng Yeh; Huntington IP Consulting Co., Ltd.

(57) ABSTRACT

A system of computing surface reconstruction, in-plane and out-of-plane displacements and strain distribution utilizes the optical switching element to switch the reference beam to analyze the images of the test object before and after deformation, to measure the topography, in-plane and out-of-plane displacements and surface two-dimensional strain distribution on the test surface of the test object, and thus to increase the measurement range on the test surface of the test object with the use of image registration. Thereby, the complexity and error of scanning the test object can be reduced. Such a system need not to move the image capturing device or test object to generate relative displacement for reaching the measurement effect of the test surface of the test object in three-dimensional coordinates.

16 Claims, 10 Drawing Sheets

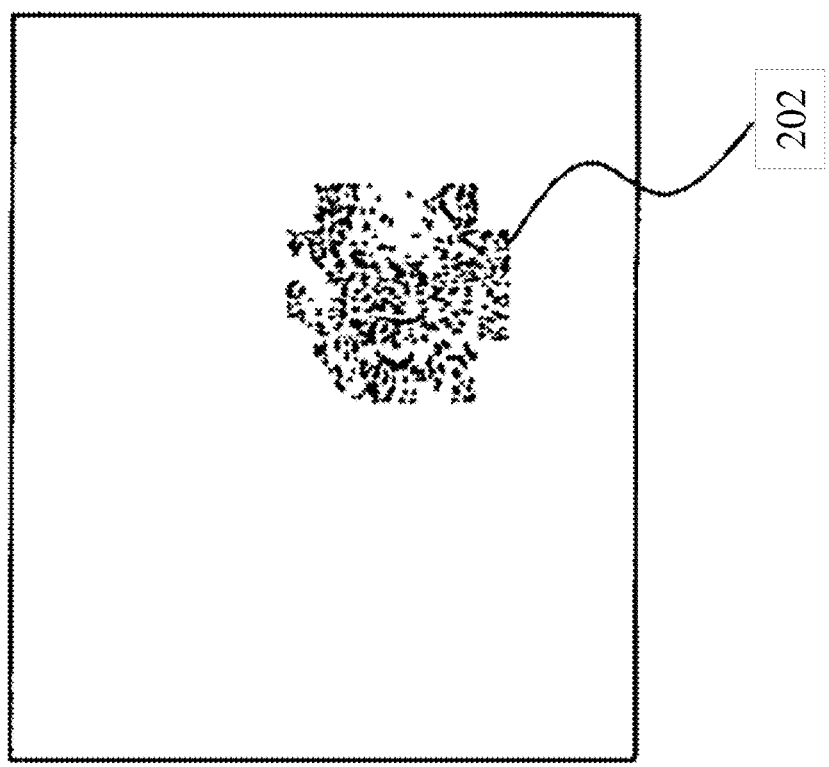
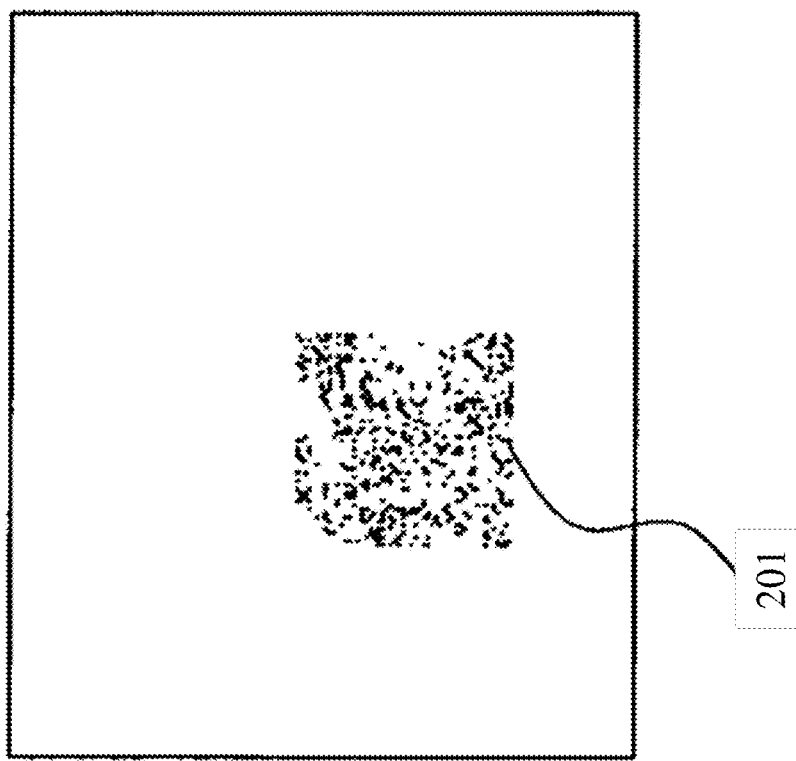
Fig. 2 (prior art)

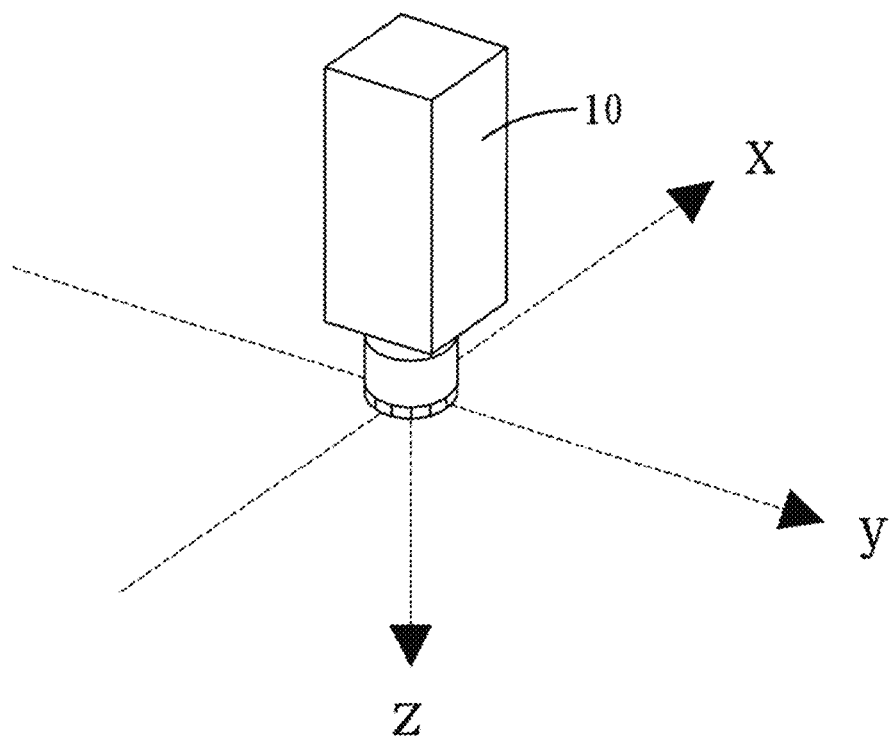
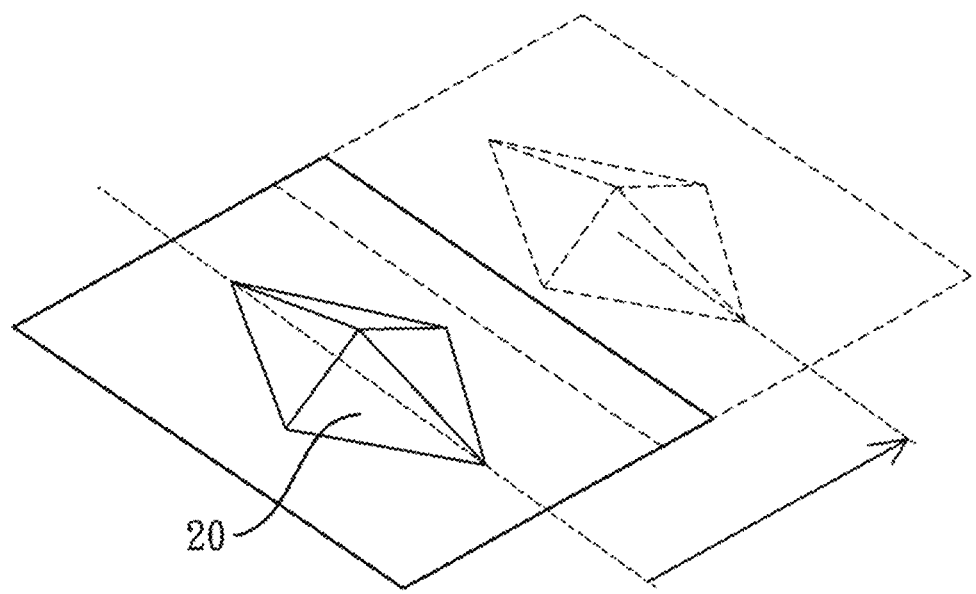
Fig. 4 (prior art)

SYSTEM OF COMPUTING SURFACE RECONSTRUCTION, IN-PLANE AND OUT-OF-PLANE DISPLACEMENTS AND STRAIN DISTRIBUTION

BACKGROUND OF THE INVENTION

1. Field of the Invention

The present invention relates to a system of computing surface reconstruction, in-plane and out-of-plane displacements and strain distribution on a test surface of a test object before and after the stress is applied.

2. Description of Related Art

The interferometer has been widely used in surface topography measurement, applied to semiconductor wafers, liquid crystal display glass panels in a manner of non-contact measurement. Types of setting an optical path of the interferometer mainly include Mirau, Linnik, and Michelson. References may be made to FIG. 1A, FIG. 1B, and FIG. 1C. FIG. 1A is a schematic architecture of a conventional Mirau type interferometer. FIG. 1B is a schematic architecture of a conventional Linnik type interferometer. FIG. 1C is a schematic architecture of a conventional Michelson type interferometer.

In the Mirau type interferometer 101 and the Michelson type interferometer 103, their reference surfaces and the objective lens are fixed and usually integrated onto their respective objective lens, which means they cannot be adjusted. Most of optical vendors have the Mirau type interferometer 101 and the Michelson type interferometer 103 already. The optical architecture of the Linnik type interferometer 102 has high flexibility in adjusting the reference optical component and is advantageously self-assembled.

Interference principle uses interference waves generated by an optical path difference between the test surface of the test object and reference light to assess optical properties of the test surface of the test object. Furthermore, with the use of an image capture device and a piezoelectric actuator, the topography measurement to the test surface of test object can be achieved, and then applied to size, profile roughness, and defects on the test surface of the test object.

For the interferometer technology, ROC Patent No. I274849, for example, uses the Mirau type interferometer along with the interference peak calculus to improve shortcomings in U.S. Pat. Nos. 5,633,715, 5,133,601, and 5,398,113, such as huge amount of data in computing algorithm for interference wave calculus and significant time consuming, while keeping its measurement accuracy and reducing computing time.

In application, R.O.C. Patent No. I333059 discloses the use of the interferometer to measure the surface profile and the film stress on a hard substrate or flexible substrate. In hardware innovation, R.O.C. Patent No. I245926 discloses an interference scanning device in which every time when in measurement, the measured object should be moved at the same level for obtaining the measurement results along the ascending and descending of the interferometer, increasing the scanning speed and accuracy.

Most of the commercially available interferometers aim at measuring the test surface of the test object. Different multiples of the measurement corresponds to different interference devices. Related patents majorly focus in the calculation of peak positions of the interference waves and the minimization in the amount of hardware in order to reduce the computing time, with good measurement accuracy and competitive computing speed. However the fixed integration in architecture of the hardware of the interferometer limits its applications to other purposes of measurements. Basically, the current related researches are mainly focus on the wave peak calculus of interferograms, rather than the improvement of hardware architecture to development of new applications for measurement.

The principle of digital image measurement is to work out relative locations for every giving a point-set on an image by comparing the correlations with point-sets in other images by means of finding the most likely gray level distribution for example. Due to the improvement of image capture devices and computing speed, the digital image measurement technique has been increased.

R.O.C. Patent Application No. 201 140 494 discloses a digital image correlation which divides captured images into a plurality of smaller sub-regions. Reference can be made to FIG. 2 which is a schematic view of images corresponding to sub-regions before and after deformation of a test object in the prior art.

A sub-region 201 is one of un-deformed sub-regions divided before deformation of the test object. A deformation. A sub-region 202 is one of deformed sub-regions divided after deformation of the test object. In order to increase the comparison effect and analysis accuracy, the test surface of the test object has randomly-produced irregular speckle patterns which show in the sub-region 201 and the sub-region 202.

The image capture device is used to capture images of the test object. With the use of deformation theory and algorithms, the patterns of the test object before and after deformation are compared to obtain the deformed sub-region 202 corresponding to the sub-region 201 before deformation, and the displacement and strain of the deformed sub-region 202. After analysis and computation of all sub-regions, the whole deformation on the test surface of the test object can be obtained.

The digital image measurement technique has two categories: two-dimensional technology and three-dimensional technology. The two-dimensional digital image correlation is to obtain the displacement and deformation data of the test object by comparing two digital images in provision that the distance between the test object to be shot and the capture device needs to be constant for the purpose of getting higher measurement accuracy. If the distance between the test object to be shot and the capture device is not constant, then measurement errors occur and the accuracy will be affected, which will need three-dimensional digital measurement technology.

The principle for the three-dimensional digital image measurement is similar to the principle of human-eyes identifying the location and the distance from a specific object. Identification of the test object in three-dimensional coordinates needs to use two images captured from the test object at two different locations. Correlation between the two images defines the related location for each point on the images and further reads the coordinates in space for the test object. In the well-developed three-dimensional measurement techniques, capturing the images of the test object at two different locations is mostly applied to capture the test object at different angles by using tow image capture devices, and then the two images captured at different angles are used to calculate the three-dimensional coordinates of the test object from the corresponding relationship for each point in the images by using the two-dimensional digital image measurement technology.

R.O.C. Patent Application No. 201 140 494 discloses a three-dimensional image measurement analysis system using three-dimensional digital image correlation (3D-DIC), which has a non-contact and non-destructive characteristics. Reference can be made to FIG. 3 which is a schematic view of architecture of a conventional three-dimensional digital image correlation system.

The architecture of a conventional three-dimensional digital image correlation system includes a first image capture device 301, a second image capture device 302, a light source 303 and a processing device 304. The first image capture device 301 and the second image capture device 302 can be a CCD camera or camcorder.

A test object 305 is set at a lens focal point of the first image capture device 301 and the second image capture device 302. The light source 303 projects uniform light onto the test object 305. The first image capture device 301 and the second image capture device 302 capture the images of the test surface of the test object 305. The captured images are input to the image input processing unit 304 for image data processing and analysis.

However, in the above three-dimensional digital image measurement, the two image capture devices used to capture the images at two different locations may have different mechanical and optical properties, and the related position between the two image capture devices is not constant, resulting in significant error in image calibration and adversely affecting image accuracy. Therefore, it is quite difficult for image calibration in the three-dimensional coordinate measurement in the prior art which uses the two image capture devices.

Please refer to FIG. 4 which is a schematic view of a conventional three-dimensional coordinate measurement. R.O.C. Patent Application No. 201 124 698 discloses a three-dimensional coordinate measurement which measures a test object, based on a three-dimensional digital image measurement device. First, a single image capture device 401 shoots a first image to a test object 402. With the movement of a shifting device (not shown), a relative displacement between the image capture device 401 and the test object 402 generates. Then, the image capture device 401 shoots a second image. The first image and the second image are respectively subject to analysis and computation by a control device (not shown) to obtain the three-dimensional coordinates of the test object 402.

Since shooting the first image and second image is performed at the same mechanical and optical conditions, only one different condition between these two shots is the lateral displacement. Therefore, the parameter calibration can be simplified and the measurement accuracy is increased, which increases convenience in measurement and dynamic measurement effect. However, it needs to move the image capture device 401, or move the test object 402 to generate the relative displacement in order to achieve the measurement of three-dimensional coordinates of the test object.

Therefore, there is a need of a novel means to solve the existing problems such as limitations to integration of configuration, and complexity and errors in parameter calibration due to inherent mechanical and optical properties.

SUMMARY OF THE INVENTION

This invention aims at solving the existing problems such as limitations to integration of configuration, and complexity and errors in parameter calibration due to inherent mechanical and optical properties.

In order to achieve the above and other objectives of the invention, a system of computing surface reconstruction, in-plane and out-of-plane displacements and strain distribution includes a light source, a first objective lens, a pinhole element, a set of lenses, a beam splitter, a second objective lens, a test object, a stress applying element, an optical switching element, a third objective lens, a reflective element, a receiving device and a control computing device.

The first objective lens is set at one side of the light source, wherein the light emitted by the light source passes through an optical center of the first objective lens. The pinhole element is set at a focus location emergent light side of the first objective lens along the emergent light direction. The set of lenses is located emergent light side of the pinhole element along the emergent light direction, wherein an optical center of the set of lenses is on the same center axis as the optical center of the first objective lens. The beam splitter is located emergent light side of the set of lenses along the emergent light direction, wherein an optical center of the beam splitter and that of the set of lenses are on the same center axis, wherein the beam splitter is used to split the incident light provided by the set of lenses into a first split beam and a second split beam. The second split beam is reflected vertically and emitted through a second emergent light side. The first split beam passes through the beam splitter and is emitted through a first emergent light side of the beam splitter. The second objective lens is located a second emergent light side of the beam splitter along the emergent light direction, wherein the second split beam passes through an optical center of the second objective lens, and the second objective lens is movably positioned along the optical center axis of the second objective lens through a movable platform. The test object is located emergent light side of the second objective lens, wherein the test object has a test surface, and the test object and the second objective lens are movably positioned through the movable platform, so that the focus location the emergent light side of the second objective lens is set on the test surface of the test object, and the test surface is scanned in planar way. The stress applying element is used to apply stress onto the test object. The optical switching element is located the first emergent light side of the beam splitter, wherein the turns on/turns off action of the optical switching element determines whether the first split beam from the beam splitter pass through the optical switching element or not. The third objective lens is set emergent light side of the optical switching element along the emergent light direction, wherein the first split beam passes through an optical center of the third objective lens, and the third objective lens is movably positioned through the movable platform along the optical center axis of the third objective lens. The reflective element is set emergent light side of the third objective lens along the emergent light direction, wherein the reflective element is movably positioned along the optical center axis of the third objective lens through the movable platform and a displacement actuator, so that the focus location emergent light side of the third objective lens along the emergent light direction is set on an optical center of the reflective element. The receiving device is set emergent light side of the beam splitter, wherein an optical center of the receiving device is on the same center axis as the optical center of the second objective lens. When the optical switching element turns off, the light which forms by reflecting the second split beam by the second objective lens travels to the receiving device through the split beam, so that the receiving device is able to receive a plurality of test images. When the optical switching element turns on, the light which forms by reflecting the second split beam by the second objective lens interferes in the beam splitter with the light which forms by reflecting the first split beam by the third objective lens, the interfered light then passing through the beam splitter to the receiving device so that the receiving device receives multiple of images with interference waves. The control computing device is electrically connected to the movable platform, the displacement actuator, the stress applying element, the optical switching element and the receiving device, respectively, to control the movable positioning of the movable platform, the operation of the control displacement actuator, the stress application to the test object by the stress applying element and the control of the turns on/turns off action of the optical switching element. The control computing device receives multiple of test images from the receiving device, and performs three-dimensional surface reconstruction on the test surface of the test object based on the image stitching and digital image correlation. The control computing device receives multiple of images with interference waves from the receiving device, and performs three-dimensional surface reconstruction on the test surface of the test object based on interference wave peak calculus. The in-plane and out-of-plane displacements of the test surface and the two-dimensional strain distribution of the test surface after the stress applying element applies the stress, according to the reconstructed three-dimensional surface before and after the stress applying element applies the stress to the test object.

The differences between the conventional technology and the present invention is that the present invention utilizes the optical switching element to switch the reference beam to analyze the images of the test object before and after deformation, to measure the topography, in-plane and out-of-plane displacements and surface two-dimensional strain distribution of the test surface of the test object, and thus to increase the measurement range on the test surface of the test object with the use of image stitching. Thereby, the complexity and error of scanning the test object can be reduced. Such a system need not to move the image capturing device or test object to generate relative displacement for reaching the measurement effect of the test surface of the test object in three-dimensional coordinates.

BRIEF DESCRIPTION OF THE DRAWINGS

FIG. 2 is a schematic view of images corresponding to sub-regions before and after deformation of a test object in the prior art.

FIG. 4 is a schematic view of a conventional three-dimensional coordinate measurement.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

Figure 1:
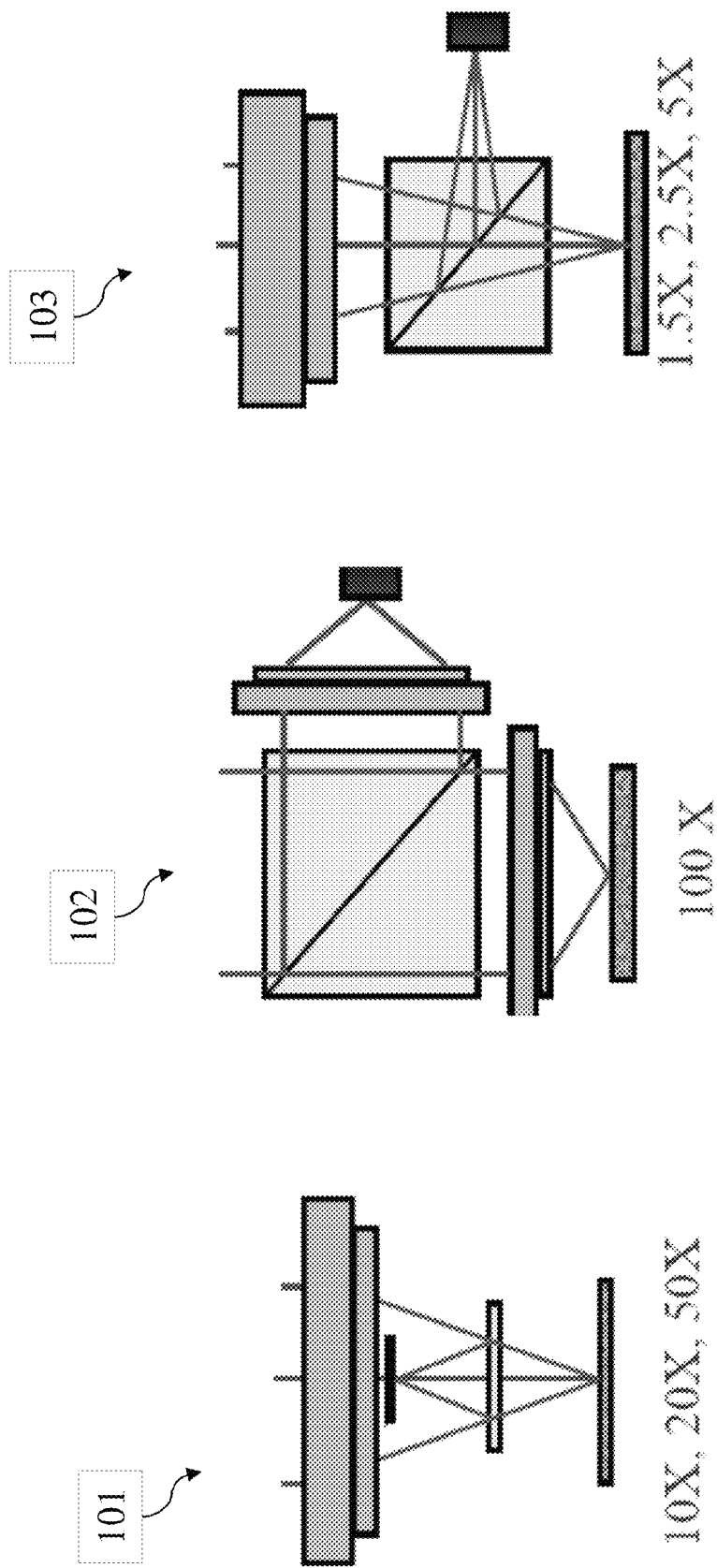
FIG. 1A is a schematic view of architecture of a conventional Mirau type interferometer.
FIG. 1B is a schematic view of architecture of a conventional Linnik type interferometer.
FIG. 1C is a schematic view of architecture of a conventional Michelson type interferometer.
Figure 3:
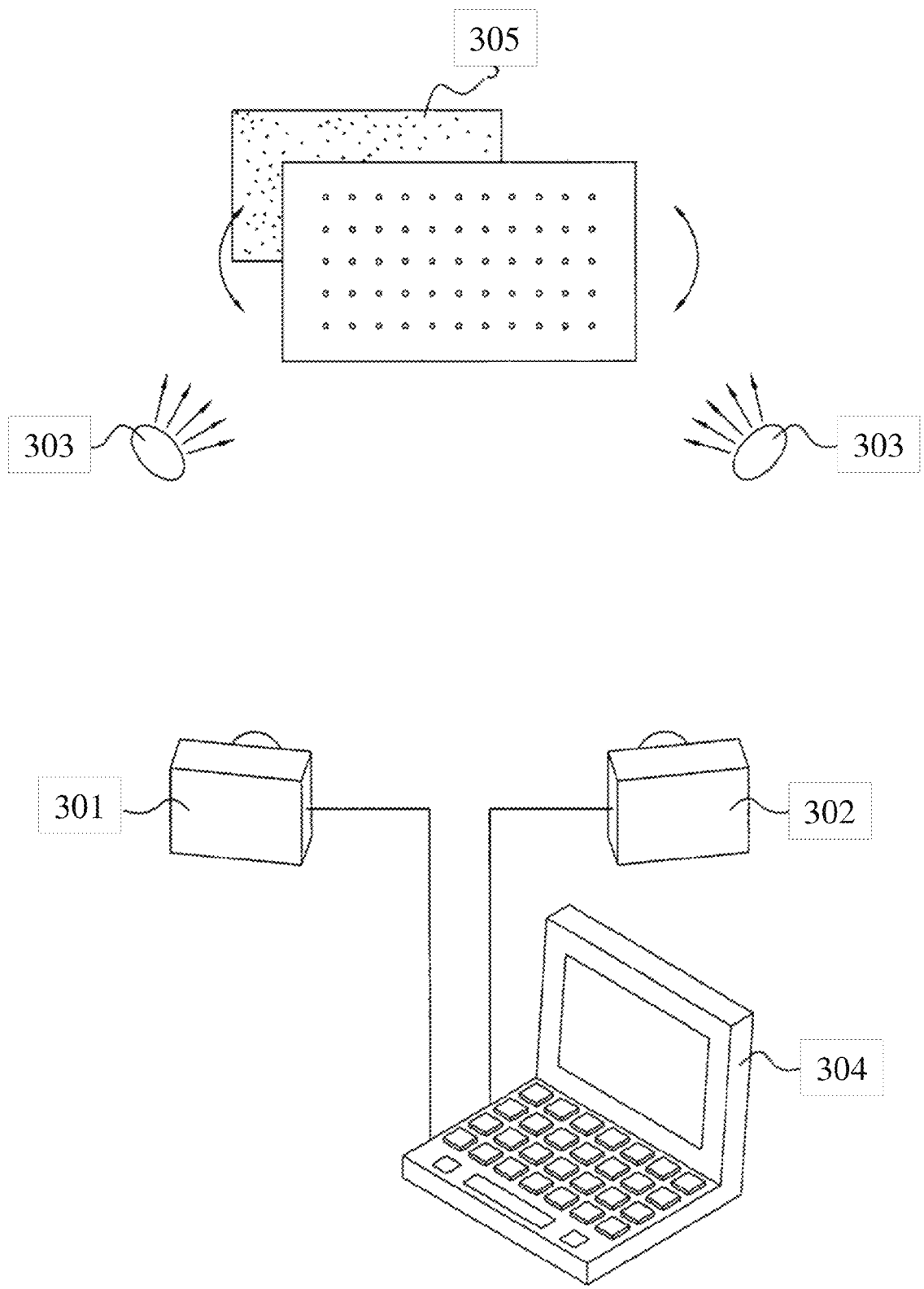
FIG. 3 is a schematic view of architecture of a conventional three-dimensional digital image correlation system.
Figure 5:
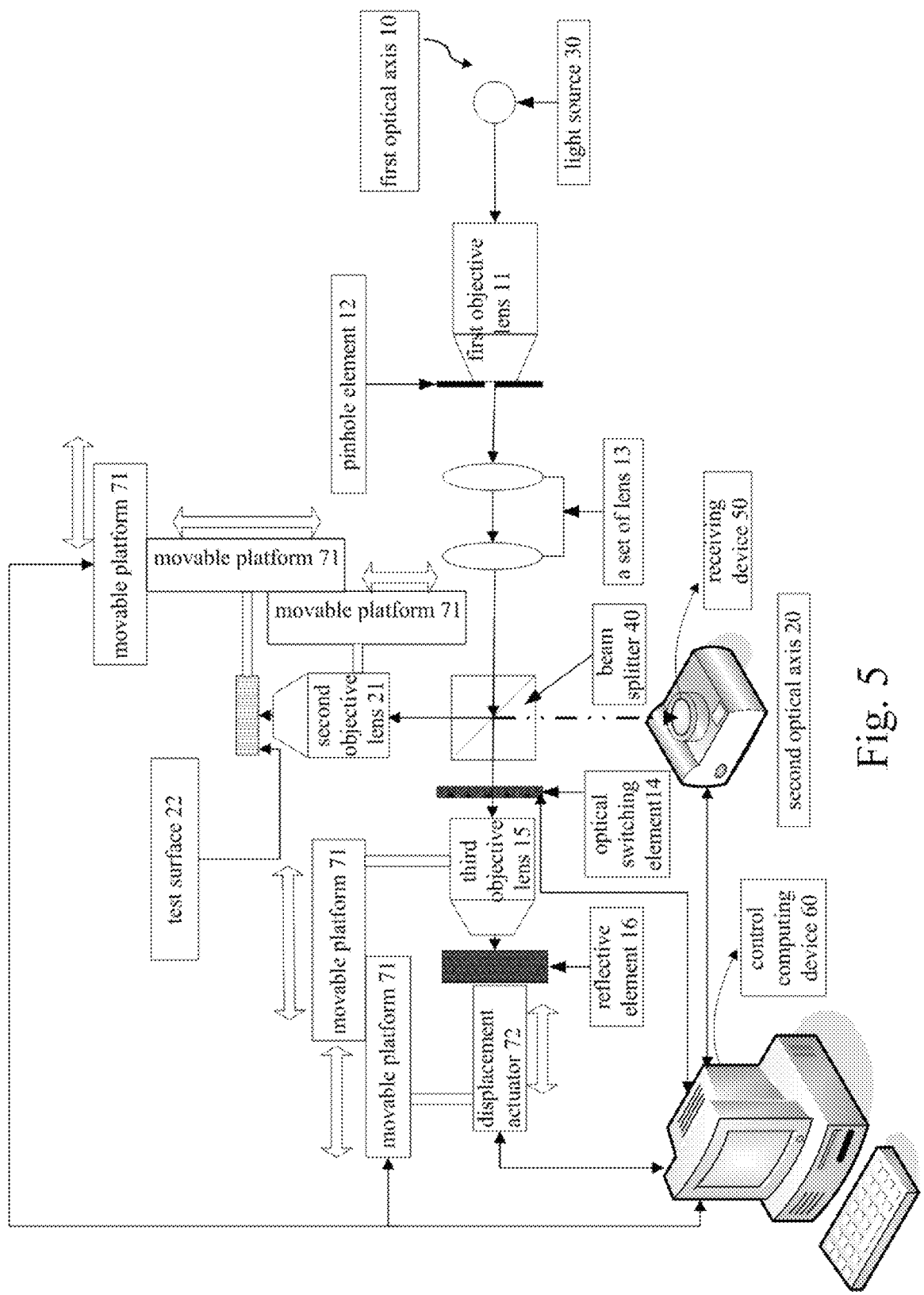
FIG. 5 is a schematic view of architecture of a system of computing surface reconstruction, in-plane and out-of-plane displacements and strain distribution according to one embodiment of the invention.

FIG. 5 is a schematic architecture of a system of surface reconstruction, in-plane and out-of-plane displacements and strain distribution according to one embodiment of the invention.

Referring to FIG. 5, the system of surface reconstruction, in-plane and out-of-plane displacements and strain distribution according to the invention includes a light source 30, a first objective lens 11, a pinhole element 12, a set of lenses 13, a beam splitter 40, a second objective lens 21, an optical switching element 14, a third objective lens 15, a reflective element 16, a receiving device 50 and a control computing device 60.

The light source 30 is set out of the first objective lens 11 along the direction of incident light. In FIG. 5, for example, the light source 30 as shown is set at right side of the first objective lens 11. As such, light rays emitted by the light source 30 travel through the first objective lens 11. The light source 30 is, but not limited to, broadband visible light generated by a halogen source, or red light emitted from an infrared light generator.

A pinhole center of the pinhole element 12 is set at a focus location emergent light side of the first objective lens 11 along the direction emitting light. That is, the pinhole center of the pinhole element 12 as shown in FIG. 5 is set to the focus location the left side of the first objective lens 11. The location of the pinhole is exemplified as mentioned above, and not intended to limit the scope of the invention. The pinhole element 12 is used for spatial filtering to eliminate high-frequency stray light, so that the quality of the light source 30 can be enhanced.

The set of lenses 13 is located emergent light side of the pinhole element 12 along the emergent light direction. As shown in FIG. 5, the set of lenses 13 is located the left side of the pinhole element 12. The location of the set of lenses 13 is exemplified as mentioned above, and not intended to limit the scope of the invention. The set of lenses 13 is used to capture the light as a collimated parallel light in order to provide the beam splitter 40 a parallel light.

The beam splitter 40 is located emergent light side of the set of lenses 13 along the emergent light direction. As shown in FIG. 5, the beam splitter 40 is located the left side of the set of lenses 13. The location of the beam splitter 40 is exemplified as mentioned above, and not intended to limit the scope of the invention. The beam splitter 40 is used to split the incident light provided by the set of lenses 13 into a second split beam and a first split beam. The second split beam is reflected vertically and emits through a second emergent light side. The first split beam passes through the beam splitter 40 and emits through a first emergent light side of the beam splitter 40.

Then, the second objective lens 21 is located a second emergent light side of the beam splitter 40. The second split beam from the beam splitter 40 passes through an optical center of the second objective lens 21. As shown in FIG. 5, the second objective lens 21 is located the upper side of the beam splitter 40. The location of the second objective lens 21 is exemplified as mentioned above, and not intended to limit the scope of the invention. The second objective lens 21 can be movably positioned along the optical axis of the second objective lens 21 through a movable platform 71. The second split beam from the beam splitter 40 passes through the second objective lens 21 along the optical axis of the second objective lens.

The test object is located the emergent light side of the second objective lens 21. As shown in FIG. 5, the test object is located the upper side of the second objective lens 21. The test object has a test surface 22, and is movably positioned along the optical axis of the second objective lens through the movable platform 71. The second objective lens 21 can be movably positioned along the optical center axis of the second objective lens through the movable platform 71, so that the focus location the upper side of the second objective lens 21 is set on a test surface 22 of the test object. The test object can be movably positioned along the optical axis of the first objective lens through the movable platform 71, so that the test surface 22 of the test object can be scanned in planar way.

Then, the stress applying element is used to apply the test object with stress. The stress applying element applies the thermal stress to the test object by laser focusing, or applies physical stress or shear stress to the test object physically. The test surface 22 of the test object deforms response to the stress applied by the stress applying element.

Then, the optical switching element 14 is located the emergent light side of the beam splitter 40. As shown in FIG. 5, the optical switching element 14 is located the left side of the beam splitter 40. The location of the optical switching element 14 is exemplified as mentioned above, and not intended to limit the scope of the invention. The turns on/turns off action of the optical switching element 14 determines whether the first split beam from the beam splitter 40 can pass through the optical switching element 14 or not. When the optical switching element 14 turns off, i.e., the optical switching element 14 is not actuated, the first split beam from the beam splitter 40 cannot pass through the optical switching element 14. When the optical switching element 14 enables, i.e., the optical switching element 14 is actuated, the first split beam from the beam splitter 40 can pass through the optical switching element 14.

The third objective lens 15 is set emergent light side of the optical switching element 14 along the emergent light direction. As shown in FIG. 5, the third objective lens 15 is set the left side of the optical switching element 14. The location of the third objective lens 15 is exemplified as mentioned above, and not intended to limit the scope of the invention. The third objective lens 15 is movably positioned through the movable platform 71 along the optical center axis of the third objective lens. When the first split beam pass through the optical switching element 14, the first split beam travels along the optical center axis of the third objective lens to pass the third objective lens 15.

The reflective element 16 is set emergent light side of the third objective lens 15 along the emergent light direction. As shown in FIG. 5, the reflective element 16 is set the left side of the third objective lens 15. The location of the reflective element 16 is exemplified as mentioned above, and not intended to limit the scope of the invention. The reflective element 16 can be movably positioned along the optical center axis of the third objective lens through the movable platform 71 and a displacement actuator 72. The third objective lens 15 can be movably positioned along the optical center axis of the third objective lens. Thereby, the focus location emergent light side of the third objective lens 15 along the emergent light direction is set on an optical center of the reflective element 16. The above-mentioned displacement actuator uses a piezo actuator (PZT) as the displacement unit.

The light emitted by the light source 30 passes through the first objective lens 11, the pinhole element 12, the set of lenses 13 to beam splitter 40. The path where the first split beam emitted by the beam splitter 40 passes through the optical switching element 14, the third objective lens 15 and returns to the reflective element 16 is referred as to a first optical axis 10. The optical center axis of the first objective lens 11 and the optical center axis of the third objective lens 15 are defined as the first optical axis 10 as well.

The path where the second split beam emitted by the beam splitter 40 passes through the second objective lens 21 to the test object and returns to the receiving device 50 is defined as a second optical axis. The first optical axis 10 is vertical to the second optical axis 20. The optical axis of the second objective lens 21 is defined as the second optical axis 20 as well.

Figure 6:
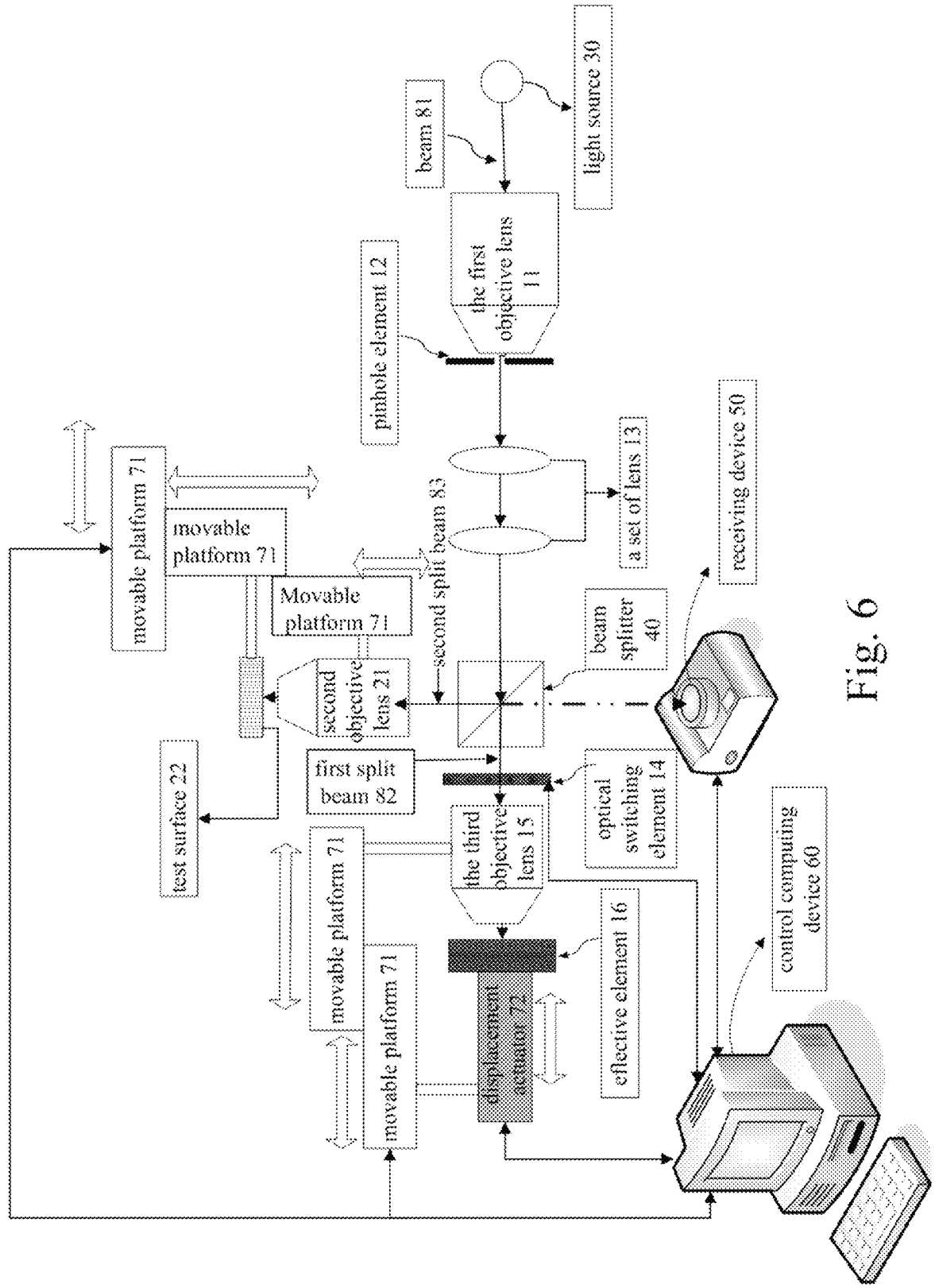
FIG. 6 is a schematic view of an optical path of a system of computing surface reconstruction, in-plane and out-of-plane displacements and strain distribution according to one embodiment of the invention.

FIG. 6 is a schematic view of an optical path of a system of surface reconstruction, in-plane and out-of-plane displacements and strain distribution according to one embodiment of the invention.

Referring to FIG. 5 and FIG. 6, a beam 81 emitted by the light source 30 along the first optical axis 10 pass through the first objective lens 11. After the beam 81 passes through the first objective lens 11, the beam 81 will be subject to special filtering by means of pinhole 12 to eliminate the high-frequency stray light in the beam 81 in order to enhance the quality of the beam 81.

After the beam 81 passes through the pinhole element 12, the set of lenses 13 is used to capture a central region of the beam 81 as a collimated parallel light for providing the beam splitter 40 with parallel light. After the beam 81 passes through the set of lenses 13, the beam 81 passing through the right side of the beam splitter 40 along the first optical axis 10 is split by the beam splitter 40 into a first split beam 82 and a second split beam 83. The first split beam 82 passes through the left side of the beam splitter 40 along the first optical axis 10. The second split beam passes through the beam splitter 40 through the second optical axis 20.

The optical center of the receiving device 50 is set on the second optical axis 20. The receiving device 50 is located emergent light side of a bottom of the beam splitter 40. It is assumed that the optical switching element 14 turns off (i.e., the optical switching element 14 is not actuated), the light which forms by reflecting the second split beam 83 by the second objective lens 21 travels to the receiving device 50 through the split beam 40, so that the receiving device 50 is able to receive a plurality of test images. Furthermore, it is assumed that the optical switching element 14 enables (i.e., the optical switching element 14 is actuated), the light which forms by reflecting the second split beam 83 by the second objective lens 21 interferes in the beam splitter 40 with the light which forms by reflecting the first split beam 82 by the third objective lens 15. The interfered light passes through the beam splitter 40 to the receiving device 50 so that the receiving device 50 receives multiple of images with interference waves.

The receiving device 50 is a charge coupled element (CCD) or a complementary metal-oxide-semiconductor (CMOS) as an imaging unit for images.

The control computing device 60 is electrically connected to the movable platform 71, the displacement actuator 72, the optical switching element 14 and the receiving device 50, respectively.

The control computing device 60, respectively, controls the movable positioning of the movable platform 71, the operation of the displacement actuator 72, the stress apply to the test object, and the control of turns on/turns off of the optical switching element 14, in order to meet the requirements for operation of respective elements.

When the optical switching element 14 turns off (i.e., the optical switching element 14 is not actuated), the light which forms by reflecting the second split beam 83 by the second objective lens 21 passes through the beam splitter 40 to the receiving device 50 for the receiving device 50 to receive multiple test images which are provided to the control computing device 60. The control computing device 60 performs three-dimensional surface reconstruction on the test surface of the test object, based on image stitching and digital image correlation.

Figure 7:
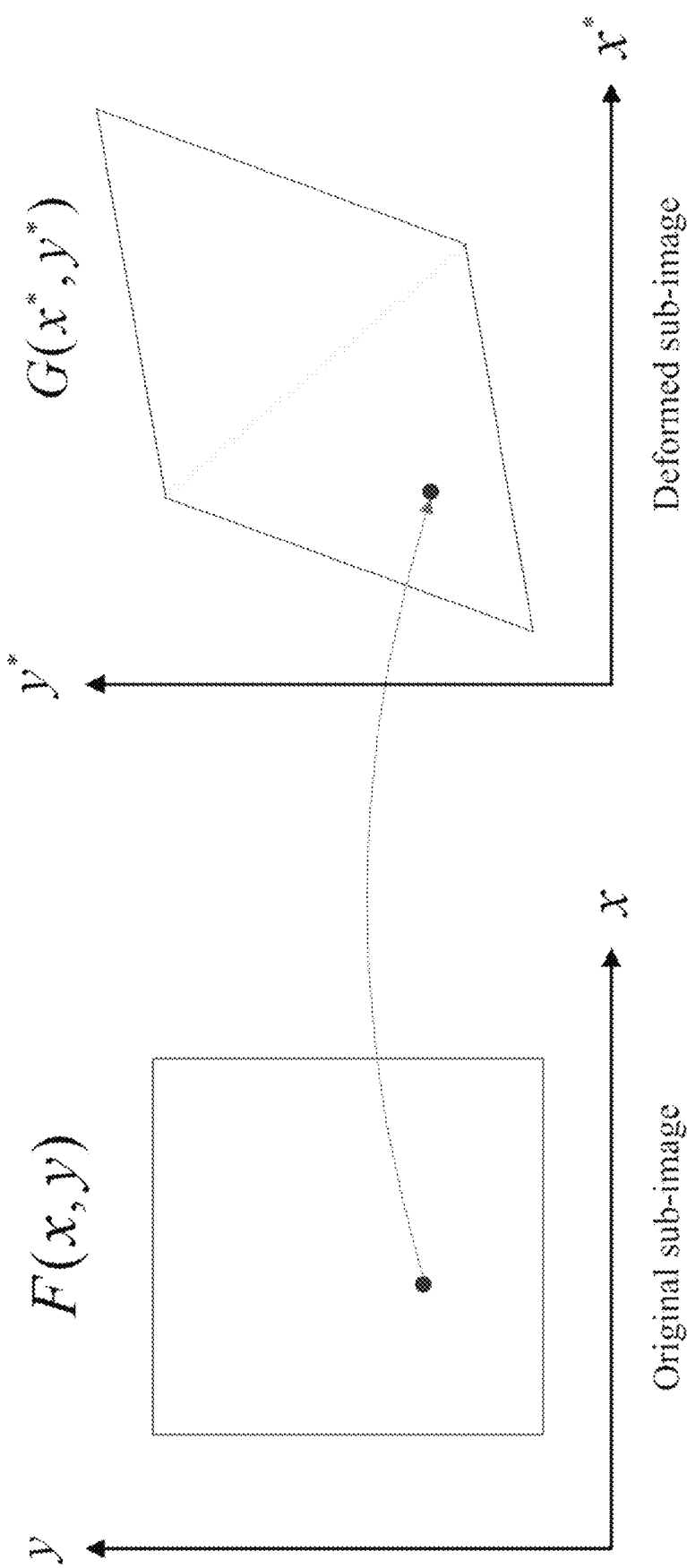
FIG. 7 is a schematic view of a digital image correlation of a system of computing surface reconstruction, in-plane and out-of-plane displacements and stress distribution according to one embodiment of the invention.

The so-called image stitching is to identify all characteristic points of each image for the multiple test images. The correlation of the characteristic points of each image combines the multiple test images into a picture mapped as a whole. Reference is also made to FIG. 7 which is a schematic view of a digital image correlation of a system of computing surface reconstruction, in-plane and out-of-plane displacements and stress distribution according to one embodiment of the invention.

Digital image correlation has been widely used whole-region and non-contact strain measurement. Images on the surface of the test surface 22 before and after image deforming are captured. Relative displacements of pixel points in specific regions of the images after image deforming are found by means of value analysis. Then the displacement, angle and strain generated by the test surface 22 are converted accordingly.

($\partial u/\partial x$, $\partial u/\partial y$, $\partial v/\partial x$, $\partial v/\partial y$) are used to describe the shape of the test surface 22 in every direction after image deforming. Each set of factors represents one condition about the deformation of the test surface 22.

A set of optical imaging sensor response values can be obtained from the corresponding geometric coordinates of the images after the deformation of the test surface 22. After the set of the optical imaging sensor response values is put into a correlation function between two images, a set of correlative coefficients is obtained. Optimization methods such as genetic algorithms or iteration can be used to optimize the strain factors. Then, the displacement and the strain of sub-images are computed and the results are output. A measurement process with feedback for whole-region deformation and displacement is performed.

For arrays of characteristic image $I_1$, $I_2$ in the same size which are acquired before and after deformation, it is necessary to establish a measurable indicator to determine the extent of dependency to one another. The dependency of the discrete array can be found by using a correlation function to measure the correlation between $I_1$ and $I_2$. From all related data and literatures, most commonly used normalized cross-correlation coefficients and least squares correlation coefficients can be found.

The normalized cross-correlation coefficient:

$$\Phi = \frac{\sum_{i,j=CZ/2}^{CZ/2}[I_1(i,j) \times I_2(i',j')]}{\left[\sum_{i,j=CZ/2}^{CZ/2}[I_1(i,j)]^2 \times \sum_{i,j=CZ/2}^{CZ/2}[I_2(i',j')]^2\right]^{1/2}}$$

The least squares correlation coefficient:

$$\Phi^* = \sum_{i,j=CZ/2}^{CZ/2}[I_1(i,j) - I_2(i',j')]^2$$

wherein, $\Phi$ is called the cross-correlation coefficient, correlation between a pair of images. CZ is the size of the selected image array. In the application of normalized cross-correlation coefficients, only when $I_1$ and $I_2$ are exactly the same the value equals to 1. In the case that the value is not 1, the value the closer to 1, the similarity goes higher. To the contrary, in the application of least squares correlation coefficients, when $I_1$ and $I_2$ are exactly the same the $\Phi^*$ value equals to 0 no matter the normalization is performed or not. In the case that the $\Phi^*$ value is not 0, the $\Phi^*$ value closer to 0 the similarity goes higher, which means the minimum deformation of the test object.

A mutual coefficient $r_{ij}$ can be obtained from a two-dimensional digital image correlation by iteration:

$$r_{ij} = \left(u, v, \frac{\partial u}{\partial x}, \frac{\partial u}{\partial y}, \frac{\partial v}{\partial x}, \frac{\partial v}{\partial y}\right)$$

$$= 1 - \frac{\sum_i \sum_j [F(x_i, y_j) - \overline{F}][G(x_i^*, y_j^*) - \overline{G}]}{\sqrt{\sum_i \sum_j [F(x_i, y_j) - \overline{F}]^2 \sum_i \sum_j [G(x_i^*, y_j^*) - \overline{G}]^2}}$$

wherein, F ($x_i$, $y_j$) is a pixel intensity or gray scale value of an image at point ($x_i$, $y_j$) before deformation; G($x_i^*$, $y_j^*$) is a pixel intensity or gray scale value of an image at point ($x_i^*$, $y_j^*$) after deformation; and $\overline{F}$ and $\overline{G}$ are respectively average values for strength matrix at measurement points F and G. Deformation amounts of two images before and after deformation at points ($x_i$, $y_j$) and ($x_i^*$, $y_j^*$) moving perpendicular to an optical axis of a camera can be converted to a two-dimensional affine as follows.

$$x^* = x + u + \frac{\partial u}{\partial x}\Delta x + \frac{\partial u}{\partial y}\Delta y$$

$$y^* = y + v + \frac{\partial v}{\partial x}\Delta x + \frac{\partial v}{\partial y}\Delta y$$

Referring to FIG. 5 and FIG. 6, when the optical switching element 14 turn-on (i.e., the optical switching element 14 is actuated), the light which forms by reflecting the second split beam 83 through the second objective lens 21 interferes in the beam splitter 40 with the light which forms by reflecting the first split beam 82 through the third objective lens 15. The interfered light passes through the beam splitter 40 to the receiving device 50 so that the receiving device 50 receives multiple of images with interference waves. The receiving device 50 can provide a multiple of images with interference waves to the control computing device 60. The control computing device 60 can perform surface reconstruction on the test surface of the test object, based on the interference wave peak calculus.

Figure 8:
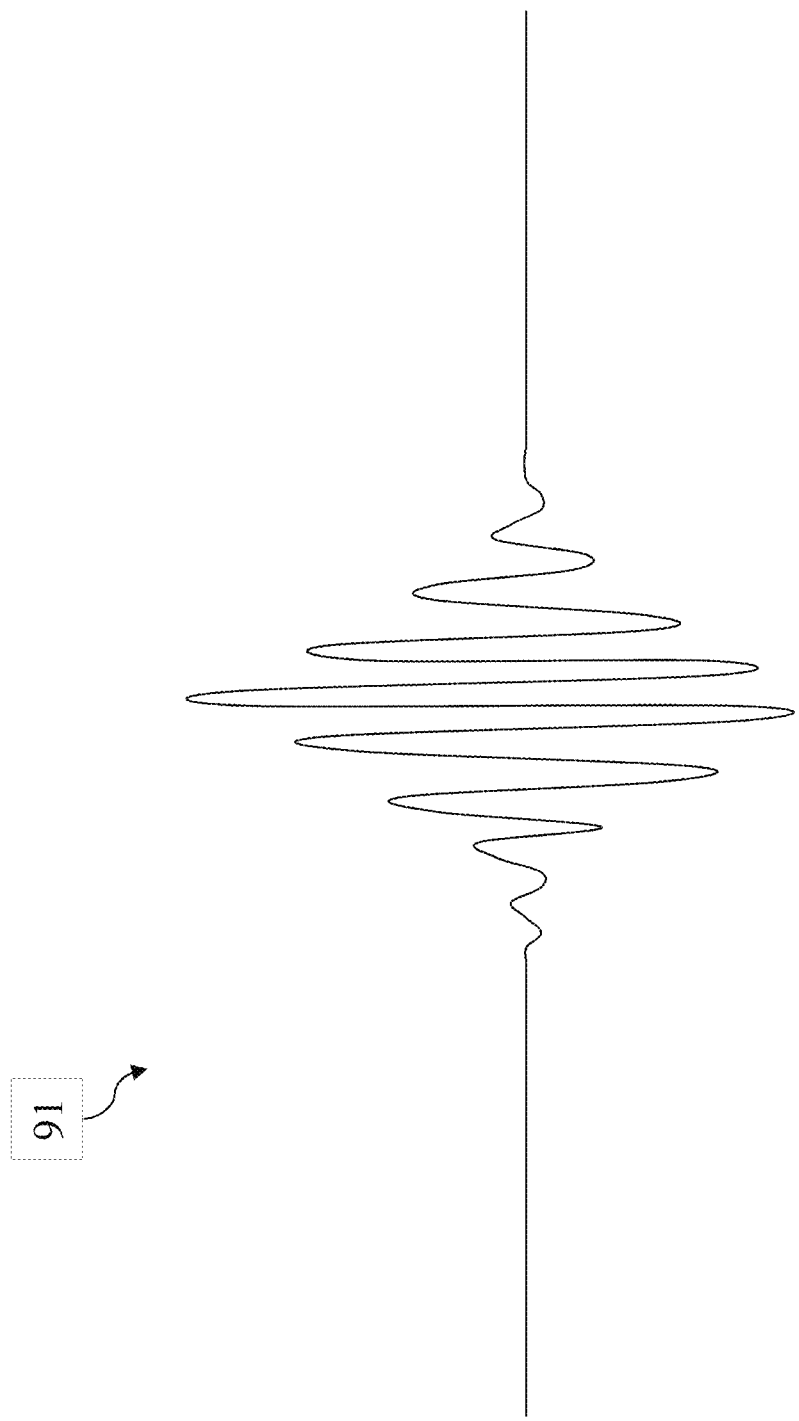
FIG. 8 is a schematic view of interference waves of a system of computing surface reconstruction, in-plane and out-of-plane displacements, and stress distribution according to one embodiment of the invention.
Figure 9:
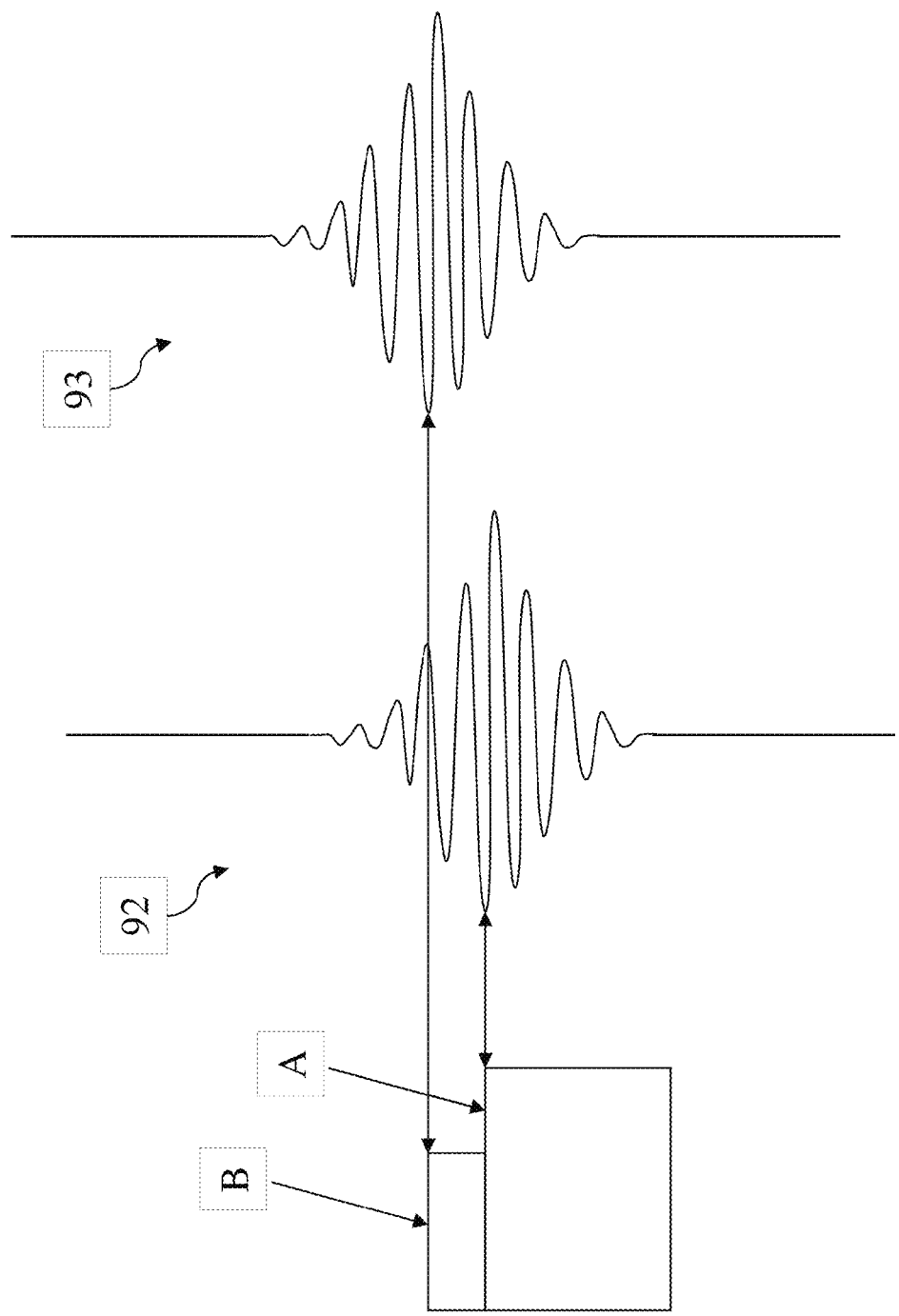
FIG. 9 is a schematic view of interfered surface reconstruction of a system of computing surface reconstruction, in-plane and out-of-plane displacements, and strain distribution according to one embodiment of the invention.

FIG. 8 is a schematic view of interference waves of a system of computing surface reconstruction, in-plane and out-of-plane displacements, and strain distribution according to one embodiment of the invention. FIG. 9 is a schematic view of interfered surface reconstruction of a system of surface reconstruction, in-plane and out-of-plane displacements, and strain distribution according to one embodiment of the invention.

Referring to FIG. 8 and FIG. 9, with the use of interference light waves of similar frequency picked out from broadband visible and infrared light, interference waves intensity 91 which has short coherence and not easy to produce interference. In acquiring three-dimensional surface data, the white-light interference uses the feature that two light waves of the same characteristic have the most obvious contrast in zero optical path difference to determine the location wherein the zero optical path difference occurs. Thereby, the topography of the three-dimensional surface of the test object is obtained.

When the measurement point A is measured, it corresponds to a first interference wave 92. After the location where interferes the zero optical path difference is obtained, the height of the measured object at that point can be determined. When the measurement point B is measured, it corresponds to a second interference wave 93. After the location where zero optical path difference is obtained, the height of the measured object at that point can be determined. The heights of the measured objects at every point can be determined similarly. Thereby, the topology of an object is defined with the height of the object point by point. Where the height of each point can change the interference wave forms in a camera captured image. From the change in such heights, the location where interferes the zero optical path can be obtained to determine the height of measured object at that point and further obtain the overall surface contour of the measured object.

Referring to FIG. 5 and FIG. 6, using the control computing device 60, we can calculate three-dimension surface of the test surface 22 before and after the stress applying element has applied stress onto the test object, and calculate the displacement on the in-plane and out-of-plane surface and two-dimensional strain distribution of the test surface 22 after the stress applying element has applied stress onto the test object.

Figure 10:
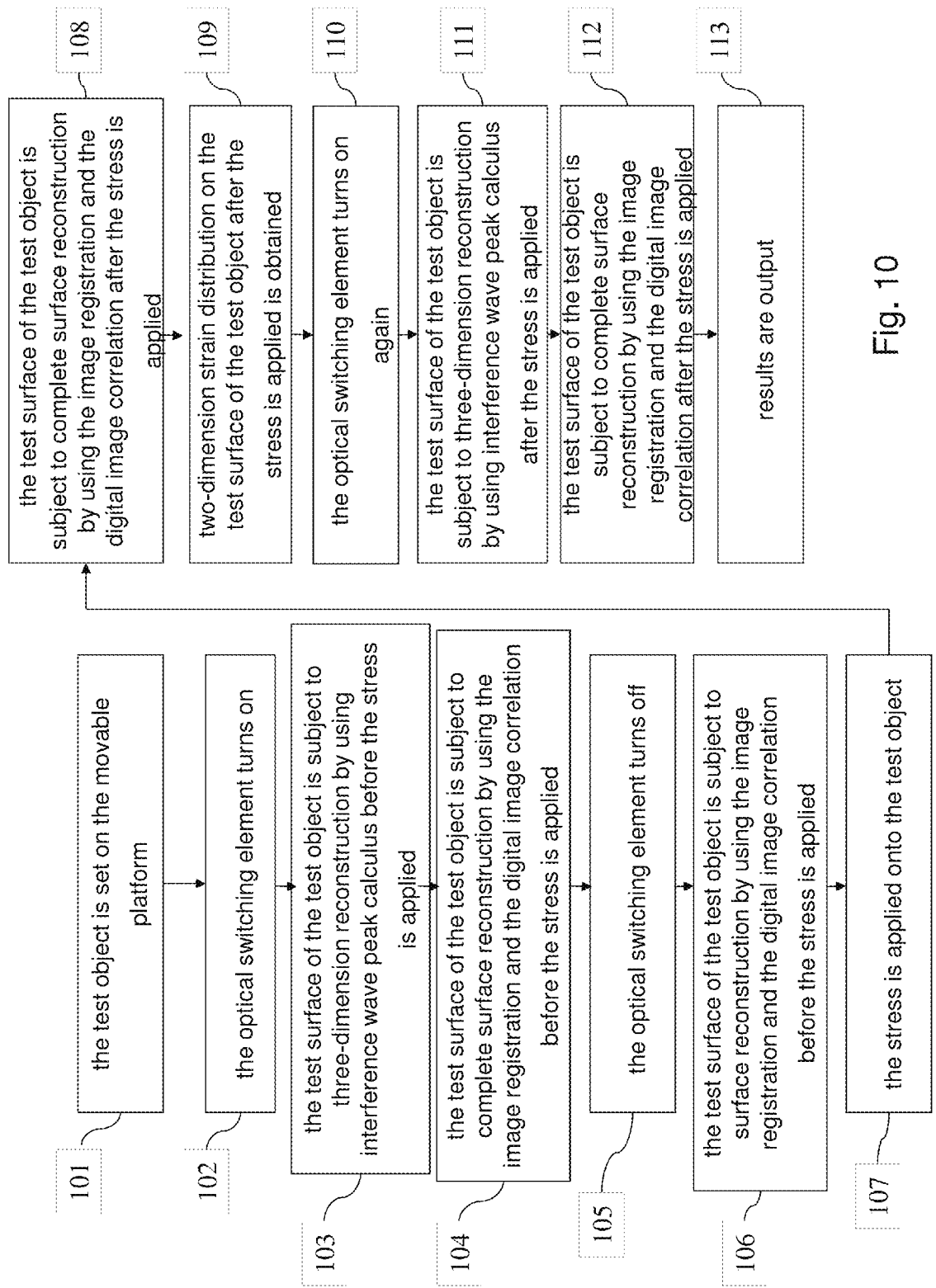
FIG. 10 is a flow chart of operating a system of computing surface reconstruction, in-plane and out-of-plane displacements, and stress distribution according to one embodiment of the invention.

FIG. 10 is a flow chart of operating a system of surface reconstruction, in-plane and out-of-plane displacements, and stress distribution according to one embodiment of the invention.

Referring to FIG. 5, FIG. 6 and FIG. 10, the test object is set on the movable platform 71 (Step 101). Then, the optical switching element 14 enables (i.e., the optical switching element 14 is actuated, Step 102) so that the beam 81 emitted from the light source 30 along the first optical axis 10 passes the first objective lens 11, the pinhole element 12, the set of lenses 13 to the beam splitter 40. The beam splitter 40 can split the beam 81 into the first split beam 82 and the second split beam 83. The first split beam 82 travels along the optical axis 10 and passes through the left side of the beam splitter 40. The second split beam 83 travels along the second optical axis 20 and passes through the upper side of the beam splitter 40.

The light which forms by reflecting the second split beam 83 by the second objective lens 21 interferes, in the beam splitter 40, with the light which forms by reflecting the first split beam 82 by the third objective lens 15. The interfered light passes through the beam splitter 40 to the receiving device 50 so that the receiving device 50 receives multiple of images with interference waves. The receiving device 50 can provide the control computing device 60 with the above images with interference waves before the stress is applied. The control computing device 60 performs three-dimensional surface reconstruction on the test surface 22 of the test object before the stress is applied, according to interference wave peak calculus. The location of the interference wave with most intensity can be then found. The test surface 22 of the reconstructed test object is subject to three-dimension reconstruction before the stress is applied, so that the surface contour of the test object before the stress is applied is measured (Step 103).

The height of test surface 22 is corrected by scanning with movable platform 71 area by area. The area is limited by second objective lens 21. Each area and its neighborhood areas can be stitched with digital image correlation and the image stitching to form whole field topology of test surface 22. That is, the three-dimensional reconstruction of test surface 22 can be achieved with digital image correlation and the image stitching of the test object (Step 104、106、108、112).

After the complete reconstruction of the test surface 22 of the test object before the stress is applied, the optical switching element 14 turns off (i.e., the optical switching element 14 is not actuated, Step 105) the beam 81 emitted from the light source 30 along the first optical axis 10 passes the first objective lens 11, the pinhole element 12, the set of lenses 13 to the beam splitter 40. The beam splitter 40 can split the beam 81 into the first split beam 82 and the second split beam 83. The first split beam 82 travels along the optical axis 10 and passes through the left side of the beam splitter 40. The second split beam 83 travels along the second optical axis 20 and passes through the upper side of the beam splitter 40.

The light which forms by reflecting the second split beam 83 by the second objective lens 21 interferes, in the beam splitter 40, with the light which forms by reflecting the first split beam 82 by the third objective lens 15. The interfered light passes through the beam splitter 40 to the receiving device 50 so that the receiving device 50 receives multiple of images with interference waves. The receiving device 50 can provide the control computing device 60 with multiple of test images before the stress is applied. The control computing device 60 performs three-dimensional surface reconstruction on the test surface 22 of the test object before the stress is applied (Step 106).

After the complete reconstruction of the test surface 22 of the test object before the stress is applied, the stress applying element applies stress onto the test object by using the control computing device 60 (for example, thermal stress is applied to the test object by laser focusing, Step 107). The light which forms by reflecting the second split beam 83 through the second objective lens 21 passes through the beam splitter 40 to the receiving device 50 so that the receiving device 50 receives multiple of test images after the stress is applied. The receiving device 50 can provide the control computing device 60 with multiple of test images after the stress is applied. The control computing device 60 performs complete surface reconstruction on the test surface 22 of the test object after the stress is applied, according to image stitching and digital image correlation (Step 108).

From the test surface 22 of the test object before the stress is applied and the test surface 22 of the test object after the stress is applied, two-dimensional strain distribution on the test surface 22 of the test object after the stress is applied can be obtained via the digital image correlation (Step 109).

Then the optical switching element 14 enables (i.e., the optical switching element 14 is actuated, Step 110), so that the beam 81 emitted from the light source 30 along the first optical axis 10 passes the first objective lens 11, the pinhole element 12, the set of lenses 13 to the beam splitter 40. The beam splitter 40 can split the beam 81 into the first split beam 82 and the second split beam 83. The first split beam 82 travels along the optical axis 10 and passes through the left side of the beam splitter 40. The second split beam 83 travels along the second optical axis 20 and passes through the upper side of the beam splitter 40.

The light which forms by reflecting the second split beam 83 by the second objective lens 21 interferes, in the beam splitter 40, with the light which forms by reflecting the first split beam 82 by the third objective lens 15. The interfered light passes through the beam splitter 40 to the receiving device 50 so that the receiving device 50 receives multiple of images with interference waves after the stress is applied. The receiving device 50 can provide the control computing device 60 with the above images with interference waves before the stress is applied. The control computing device 60 performs three-dimensional surface reconstruction on the test surface 22 of the test object after the stress is applied; according to interference wave peak calculus. The location of the interference wave with most intensity can be then found. The test surface 22 of the reconstructed test object is subject to three-dimensional reconstruction after the stress is applied, so that the surface contour of the test object after the stress is applied is measured (Step 111). The results of every image after three-dimensional reconstruction, along with the image stitching and the digital image correlation, is used to completely reconstruct the test surface 22 of the test object after the stress is applied (Step 112).

Finally, the following results are output: the test surface 22 of the test object having images with interference waves completely reconstructed before the stress is applied, the test surface 22 of the test object having images completely reconstructed before the stress is applied, the test surface 22 of the test object having images with interference waves completely reconstructed after the stress is applied, the test surface 22 of the test object having images completely reconstructed after the stress is applied, and the two-dimensional strain distribution on the test surface 22 of the test object after the stress is applied (Step 113).

In summary, the differences between the conventional technology and the present invention is that the present invention utilizes the optical switching element to switch the reference beam to analyze the images of the test object before and after deformation, to measure the topography, in-plane and out-of-plane displacements and surface two-dimensional strain distribution of the test surface of the test object, and thus to increase the measurement range on the test surface of the test object with the use of image stitching. Thereby, the complexity and error of scanning the test object can be reduced. Such a system need not to move the image capturing device or test object to generate relative displacement for reaching the measurement effect of the test surface of the test object in three-dimensional coordinates.

By such a technical means, the existing problems such as limitations to integration of configuration, and complexity and errors in parameter calibration due to inherent mechanical and optical properties can be solved. Thereby, the complexity and errors of scanning the test object can be reduced, while parameter calibration can be simplified with improved accuracy in image processing.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A system of computing surface reconstruction, in-plane and out-of-plane displacements, and strain distribution, the system comprising:
    a light source;
    a first objective lens, set at one side of the light source, wherein the light emitted by the light source passes through the first objective lens;
    a pinhole element, set at a focus location emergent light side of the first objective lens along the emergent light direction;
    a set of lenses, located emergent light side of the pinhole element along the emergent light direction, wherein an optical center of the set of lenses is on the same center axis as the optical center of the first objective lens;
    a beam splitter, located emergent light side of the set of lenses along the emergent light direction, wherein an optical center of the beam splitter and that of the set of lenses are on the same center axis, wherein the beam splitter is used to split the incident light provided by the set of lenses into a first split beam and a second split beam and, the second split beam being reflected vertically and emitted through a second emergent light side, and the first split beam passing through the beam splitter and being emitted through a first emergent light side of the beam splitter;
    a second objective lens, located a second emergent light side of the beam splitter, wherein the second split beam from the beam splitter passes through an optical center of the second objective lens, and the second objective lens is movably positioned along the optical center axis of the second objective lens through a movable platform;
    a test object, the test object is located emergent light side of the second objective lens, wherein the test object has a test surface, and the test object and the second objective lens are movably positioned through the movable platform, so that the focus location emergent light side of the second objective lens is set on the test surface of the test object, and the test surface is scanned in planar way;
    a stress applying element, the stress applying element is used to apply stress onto the test object;
    an optical switching element, located the first emergent light side of the beam splitter, wherein the turns on/turns off action of the optical switching element determines whether the first split beam from the beam splitter pass through the optical switching element or not;
    a third objective lens, set emergent light side of the optical switching element along the emergent light direction, wherein the first split beam passes through an optical center of the third objective lens, and the third objective lens is movably positioned through the movable platform along the optical center axis of the third objective lens;
    a reflective element, set emergent light side of the third objective lens along the emergent light direction, wherein the reflective element is movably positioned along the optical center axis of the third objective lens through the movable platform and a displacement actuator, so that the focus location emergent light side of the third objective lens along the emergent light direction is set on an optical center of the reflective element;
    a receiving device, set emergent light side of the beam splitter, wherein the optical center of the receiving device is on the same center axis as the optical center of the second objective lens, and wherein when the optical switching element turns off, the light which forms by reflecting the second split beam by the second objective lens travels to the receiving device through the split beam, so that the receiving device is able to receive a plurality of test images; and when the optical switching element turns on, the light which forms by reflecting the second split beam by the second objective lens interferes in the beam splitter with the light which forms by reflecting the first split beam by the third objective lens, the interfered light then passing through the beam splitter to the receiving device so that the receiving device receives multiple of images with interference waves; and a control computing device, electrically connected to the movable platform, the displacement actuator, the stress applying element, the optical switching element and the receiving device, respectively, to control the movable positioning of the movable platform, the operation of the control displacement actuator, the stress application to the test object by the stress applying element and the control of the turns on/turns off action of the optical switching element, and wherein:

the control computing device receives multiple of test images from the receiving device, and performs three-dimensional surface reconstruction on the test surface of the test object based on image stitching and digital image correlation;

the control computing device receives multiple of images with interference waves from the receiving device, and performs three-dimensional surface reconstruction on the test surface of the test object based on interference wave peak calculus; and the in-plane and out-of-plane displacements of the test surface and the two-dimensional strain distribution of the test surface after the stress applying element applies the stress, according to the reconstructed three-dimensional surface before and after the stress applying element applies the stress to the test object.

2. The system of claim 1, wherein the light source is broadband visible light or broadband infrared.

3. The system of claim 1, wherein the receiving device is a charge coupled element (CCD) or a complementary metal-oxide-semiconductor (CMOS) as an imaging unit for images.

4. The system of claim 1, wherein the displacement actuator uses a piezo actuator (PZT) as the movable platform.

5. The system of claim 1, wherein the control computing device performs three-dimensional surface reconstruction on the test surface of the test object, based on the interference wave peak calculus at the location where the interference wave has the most intensity.

6. The system of claim 1, wherein the control computing device performs three-dimensional surface reconstruction on the test surface of the test object, based on the image stitching and the digital image correlation, and wherein the image stitching is used to increase the reconstruction range for the test surface.

7. The system of claim 1, wherein the pinhole element is used for spatial filtering to eliminate high-frequency stray light, so that the quality of the light source can be enhanced.

8. The system of claim 1, wherein the set of lenses is used to capture the light central region as a collimated parallel light.

9. The system of claim 1, wherein a path where the light from the light source passes through the first objective lens, the pinhole element, the set of lenses to the beam splitter, and another path where the first split beam from the beam splitter passes through the optical switching element, the third objective lens to the reflective element and returns are defined as a first optical axis.

10. The system of claim 1, wherein the second split beam from the beam splitter passes through the second objective lens to the test object and returns to the receiving device is defined as a second optical axis.

11. The system of claim 10, wherein the second optical axis is vertical to the first optical axis.

12. The system of claim 1, wherein the wave peak calculus using interference patterns formed by light waves of similar characteristics whose interference patterns have the most obvious contrast when at a zero optical path difference to determine the location wherein the zero optical path difference occurs, thereby acquiring the change in the three-dimensional topography of the test object.

13. The system of claim 1, wherein after the stress applied, the two-dimensional strain distribution is obtained by finding relative displacements of pixel points in specific regions of the images after deformation by means of value analysis, and then converting to the train generated by the test object.

14. The system of claim 1, wherein the digital image correlation is used to determine a set of related coefficients obtained from a cross-correlation function between two images, and to optimize strain factors.

15. The system of claim 1, wherein in the digital image correlation, two different images are taken to correspond to characteristic images of respective sub-images; when the two images are exactly the same the value equals to 1; if the value is not 1, the value the closer to 1, the similarity goes higher; in the application of least squares correlation coefficients, when the two images are exactly the same the value equals to 0 no matter the normalization is performed or not; and in the application of least squares correlation coefficients, if the value is not 0, then the value closer to 0 the similarity goes higher, which means the minimum deformation of the test object.

16. The system of claim 1, wherein in the digital image correlation is used to define the most likely points of neighborhood images to get the image stitching information, the images can be stitched to have whole field topology of test surface.

* * * * *